C. C. MORIAN.
CANDY MACHINE.
APPLICATION FILED MAR. 31, 1920.
1,425,998.
Patented Aug. 15, 1922.
2 SHEETS—SHEET 1.
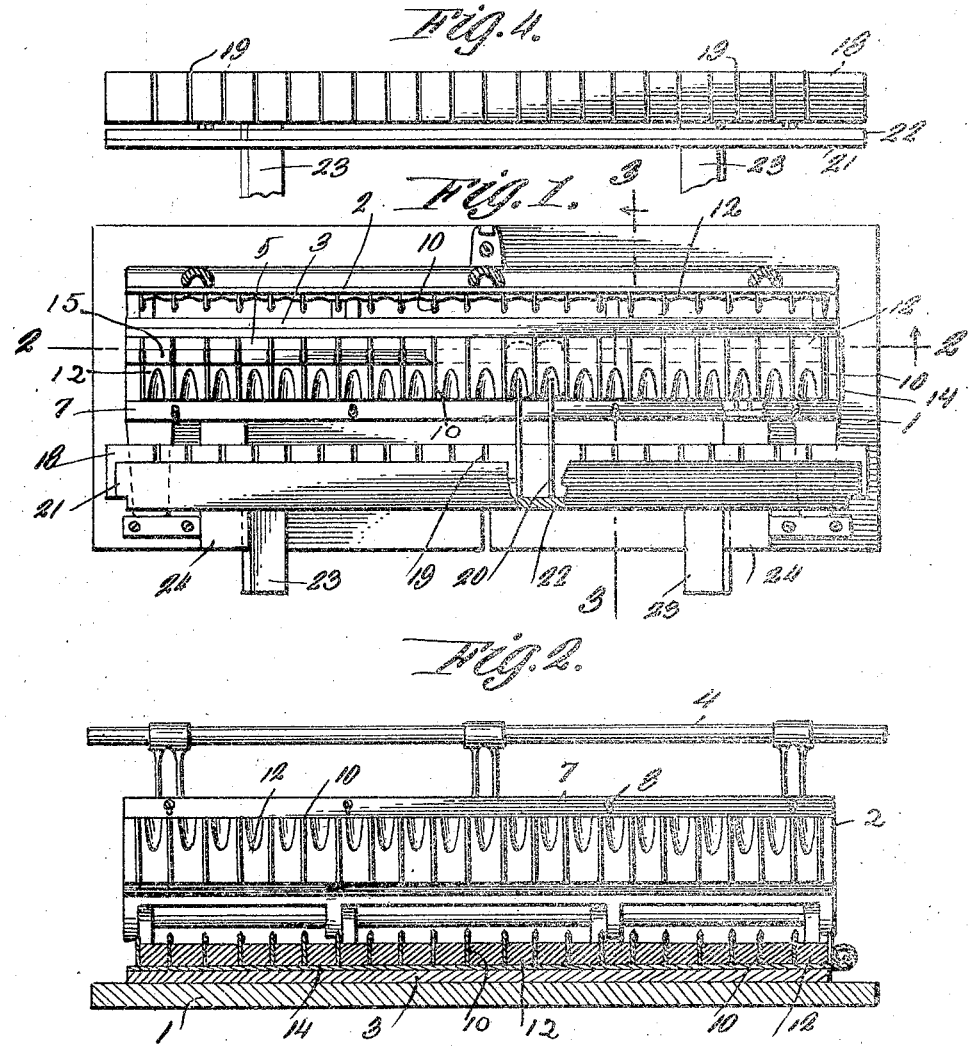
WITNESSES
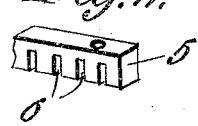
Inventor
CARLOS C. MORIAN
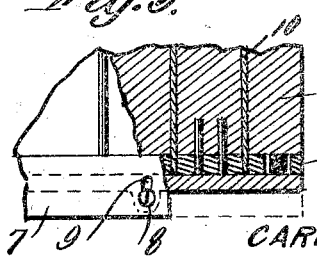
Attorney C. C. MORIAN.
CANDY MACHINE.
APPLICATION FILED MAR. 31, 1920.
1,425,998.
Patented Aug. 15, 1922.
2 SHEETS—SHEET 2.
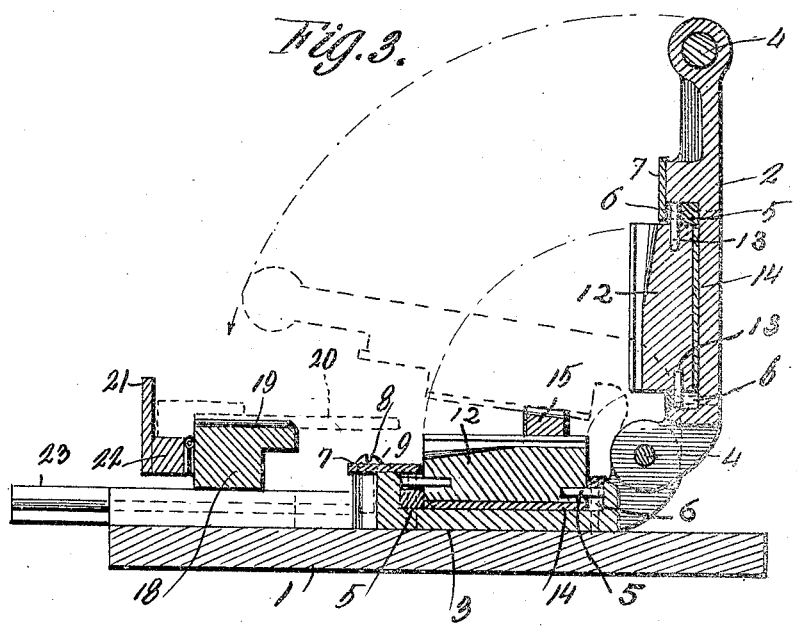
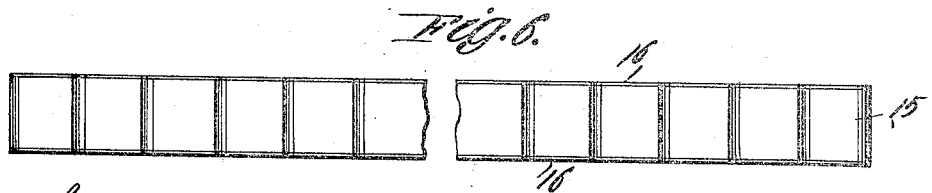
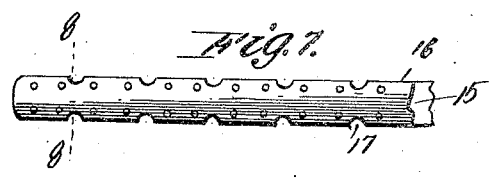
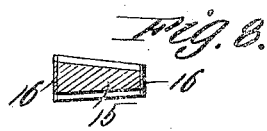
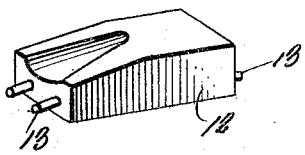
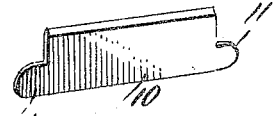
WITNESSES
Guy M. Sprung
V. B. Hillyard.
Inventor
CARLOS C. MORIAN
By Richard B. Owen.
Attorney

UNITED STATES PATENT OFFICE.

CARLOS C. MORIAN, OF OLEAN, NEW YORK.

CANDY MACHINE.

1,425,998.   Specification of Letters Patent.   Patented Aug. 15, 1922.

Application filed March 31, 1920. Serial No. 370,198.

*To all whom it may concern:*

Be it known that I, CARLOS C. MORIAN, a citizen of the United States, residing at Olean, in the county of Cattaraugus and State of New York, have invented certain new and useful Improvements in a Candy Machine, of which the following is a specification.

A certain class of candy is provided with sticks or stems to be held in the hand while the candy is slowly dissolved in the mouth, thereby preventing the fingers from becoming sticky. Candy of the kind for which the present machine is designed is generally known as sucker.

The invention provides a machine which enables the candy to be manufactured in a sanitary way and in a rapid manner and with uniformity.

The invention essentially relates to a hand machine which is adapted for the manufacture of a variety of candy of different forms and sizes, and with or without attached sticks or stems.

The drawings illustrate a preferred embodiment of the same to meet different conditions, various changes in the form, proportion, and minor details of construction may be resorted to, without departing from the nature of the invention as claimed hereinafter.

Referring to the drawings hereto attached:

Figure 1 is a top plan view of a machine embodying the invention, parts being broken away.

Fig. 2 is a vertical section on the line 2—2 of Fig. 1 looking in the direction of the arrow.

Fig. 3 is a transverse section on the line 3—3 of Fig. 1 showing the parts on a larger scale and an adjusted position of certain parts by dotted lines.

Fig. 4 is a top plan view of the stick or stem holder, a portion of the guides being broken away.

Fig. 5 is a fragmentary view of a corner portion of one of the frame members.

Fig. 6 is a plan view of the stop, an intermediate portion being broken away.

Fig. 7 is an edge view of a portion of the stop.

Fig. 8 is a cross section of the stop on the line 8—8 of the Fig. 7.

Fig. 9 is a detail perspective view of one of the filler elements.

Fig. 10 is a perspective view of one of the blades or cutters.

Fig. 11 is a detail view of a portion of one of the notched bars.

Corresponding and like parts are referred to in the following description and indicated in the several views of the drawings by like reference characters.

For convenience the machine is shown mounted upon a bed 1 which may consist of a support of any nature for receiving the working parts. The machine proper comprises similar frames 2 and 3, which are preferably hingedly connected as indicated at 4, so as to maintain them in a predetermined position. One of the frames as 3, is secured to the bed 1 and is stationary. The other frame 2, is movable and is adapted to swing towards and away from the frame 3. The movable frame 2 is provided with a handle 4 for convenience of manipulation. Each of the frames 2 and 3 is of similar construction and provided with corresponding parts, hence a detailed description of one will suffice for a clear understanding of both. The inner face of each of the frames is longitudinally channeled, as shown most clearly in Fig. 3, and each of the channels receives the operating parts, such as the cutting mechanism and the shaping or molding means. These parts are removable to provide for adjustment and substitution of different shaping or molding elements according to the size and shape of the candy to be produced. A bar 5, is located at each side of the channel and is secured to the frame member in any convenient and substantial way. The bars 5 are of like formation, each being provided along one side with notches 6. The notches 6 extend transversely of the bars and are of uniform depth and equally spaced. The bars 5 are arranged so that the notches 6 at one side of the channel face outwardly whereas the notches 6 at the opposite side of the channel face inwardly. This is shown most clearly in Fig. 3. As a result of arranging the bars 5 in the manner stated the notches 6 of the inner bars are closed at their outer ends whereas the notches of the innermost bars are open at their outer ends. This arrangement facilitates the removal and the placing of the cutters and molding filler elements in position. The outer open ends of the notches 6 of the outer bars are closed by strip 7 which are secured to the respective frames by suitable fastening means, as screws 8. The strips 7 are provided with transverse slots 9 through which the fastening 8 pass. In this manner the strips 7 may be moved laterally so as to uncover the notches 6 of the outer bars to admit of the cutters and molding elements being placed in position or removed as required. When the cutters and molding elements are in position the strips 7 are moved inward to close the open ends of the notches 6 of the adjacent or outer bars 5.

The cutting mechanism consist essentially of a plurality of blades 10. Each of the blades 10 is provided with terminal projections 11 which are adapted to enter corresponding notches 6 of the bars 5 at opposite sides of the channels formed in the respective frames 2 and 3. The blades 10 are of a length to fit between the bars 5 and are retained in place by the projections 11 at their inner ends entering the closed notches 6 of the inner bars 5 and the outer projections 11 entering the notches of the outer bars 5, said notches being closed by the confining strips 7, as herein stated.

By providing the notches 6 it is obvious that the blades 10 may be spaced apart the required distance according to the size of the candy to be produced. The blades fitted to the frame 3 come opposite to and register with the blades applied to the frames 2. As a result of this arrangement, corresponding blades coact when the frames are brought together to cut a strip or roll of candy into pieces of required size.

The spaces between adjacent blades are supplied with elements 12 which constitute fillers or molding or shaping means, since they are utilized to give the required shape to the candy. The elements 12 may consist of blocks, plates, or strips and may vary in size and shape as required, whereby the machine may be adapted to the shape and size of the candy to be manufactured. The filler or molding elements 12 are provided at opposite ends with pins or projections 13 which are adapted to enter the notches 6 of the bars 5 in substantially the same manner as the projections 11 of the blades 10. The elements 12 may be of metal, wood or other desired material. It is to be understood that the cutting edges of the blade 10 project the required distance beyond the outer faces of the elements 12.

In practice the frames 2 and 3 preferably consists of cast metal and the bottoms of the channels formed in the working faces are provided with metal plates 14, which constitute a backing for the blades 10 and elements 12 to form a uniform supporting surface therefor.

A stop 15 is provided for use in conjunction with the machine to engage and hold the roll or cane of candy in position during the application of the sticks or stems. The stop 15 consists of a bar which may be of wood or other material. In the event of the stop consisting of a strip or a bar of wood its opposite sides are faced by metal plates 16 which are secured thereto in any manner. Transverse grooves are formed in opposite sides or faces of the stop 15 to receive the cutting edges of the blades 10 and prevent injury or dulling of the edges when the frames are brought together to clamp the stop and hold it in place during the application of the sticks or stems to the candy.

The holder for the sticks or stems is slidably mounted on the bed 1, and is given proper direction in its movements towards and away from the candy cutting and molding machine. The stick holder comprises a member 18 which is formed with transverse grooves in its upper face which constitute seats 19 to receive the sticks or stems 20. A stick retaining member is hingedly connected to the member 18 and comprises portions 21 and 22. The portion 21 is designed to overlap the upper grooved face of the member 18 and engage and retain the sticks 20 in the seats 19. The portion 22 overlaps the outer side of the member 18 and extends across the outer ends of the seats 19 and constitutes a butt-piece to engage the outer ends of the sticks and retain them in place during the advance of the holder to press the sticks into the candy. Suitable guide means are provided for retaining the stick holder in proper position and direct in its movements towards and away from the candy cutting and forming mechanism. As shown guide members 23 are secured to the member 18 and are disposed transversely thereof. Companion guide members 24 provided on the bed 1 coact with the guide members 23 to effect the result therein stated. The guide members 23 and 24 have a sliding engagement such as a tongue and groove joint.

The component parts of the machine being arranged substantially as herein indicated the candy to be cut and shaped is prepared in the manner well understood in the art of confectionary. Usually the candy in the form of a roll or cane is deposited upon the member 3 so as to rest upon the cutters and filler elements of such member. The stop 15 is placed in position upon the cutting and molding mechanism of the frame 3, so as to form a backing for the candy to resist the action of the stick or stems when the latter are pressed forward to enter the candy. After the roll or cane of candy has been placed upon the member 3 and the back stop 15 has been properly positioned, the member 2 is closed upon the member 3 to confine the roll or cane of candy. The sticks or stems 20 fitted to the holder are advanced and pressed into the candy by a forward movement of the holder. It is to be understood that the several operations are effected while the candy is in softened condition. After the sticks or stems have been applied to the roll or cane of candy the holder is drawn outward and the member 2 is thrown upward to admit of removal of the back stop 15. The member 2 is now closed upon the member 3 thereby bringing the coacting cutters in active operation to sever the roll or cane of candy into pieces of required size. The closing of the member 2 upon the member 3 in addition to severing the roll of candy into pieces also shapes the pieces into the required form. This is effected by the elements 12 between which the pieces of candy are compressed, thereby compelling the candy to assume the shape of the spaces provided between cooperating elements 12. If the candy is not required to be supplied with sticks or stems it is obvious that the machine may be used simply to cut and shape the candy into pieces of the required size and form. It is observed that the member 2 and the stick holder may be operated in any desired way, commonly resorted to in devices of this and analogous nature.

Having thus fully described my invention, what I claim as new and desire to secure by Letters Patent is:—

1. In a machine of the character specified, complemental frames, each having a face channeled and provided at opposite sides of the channels with notches, the notches at one side being closed at their outer ends and the notches at the opposite sides being open at their outer ends, elements having terminal projections to enter the notches at the opposite sides of the channels, and means closing the outer open ends of the notches to confine the terminal projections of the elements fitted therein.

2. In a machine of the character specified, a frame, spaced bars on the frame and provided with corresponding notches, the notches of one bar being closed at their outer ends and the notches of the other bar being open at their outer ends, elements having terminal projections entering the notches of the bars, and a confining strip secured to the notch bar having the notches opening upwardly and adapted to confine the terminal projections of the elements fitted therein.

3. In a machine of the character set forth, complemental frames, one of the frames being relatively fixed and the other movable, notched bars secured to each of the frames in spaced relation, one of the bars having the notches closed at their outer ends and the other bar having the notches open at their outer ends, blades and fillers disposed between the bars and having terminal projections entering the notches thereof, and confining strips secured to the bars having the notches opening outwardly to confine the terminal projections of the elements therein.

4. A machine of the character specified, comprising complemental frames provided with corresponding cutters and molding elements, and a back stop adapted to be secured between the frames and having clearance spaces for the cutters to prevent injury thereto.

5. In a machine of the character specified, a stick holder comprising a member grooved in a side to provide stick receiving seats, and a coacting member hingedly connected to the grooved member and having portions to overlap the grooved side of the stick receiving member and to overlap the side through which the ends of the grooves extend to form a but piece for the sticks.

6. In a machine of the character specified, complemental members provided with cutting and shaping devices, and a stick holder slidably mounted with reference to said members and comprising a member formed in a side with transverse grooves forming stick receiving seats, and a member hingedly connected to the grooved member and comprising portions to overlap adjacent sides of the grooved member and retain the sticks in place thereon.

In testimony whereof I affix my signature in presence of two witnesses.

CARLOS C. MORIAN.

Witnesses:
F. V. R. SELLMAN,
B. J. BOTH.